(12) United States Patent
Ko

(10) Patent No.: US 9,061,650 B2
(45) Date of Patent: Jun. 23, 2015

(54) DEVICE FOR ASSEMBLING AIRBAG COVER

(71) Applicant: HYUNDAI MOBIS Co., Ltd., Yongin-si, Gyeonggi-do (KR)

(72) Inventor: Seok Hoon Ko, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/280,772

(22) Filed: May 19, 2014

(65) Prior Publication Data
US 2014/0352118 A1  Dec. 4, 2014

(30) Foreign Application Priority Data
Jun. 4, 2013  (KR) ........................ 10-2013-0064210

(51) Int. Cl.
*B60R 21/203* (2006.01)
*B60R 21/2165* (2011.01)

(52) U.S. Cl.
CPC ......... *B60R 21/21656* (2013.01); *B60R 21/203* (2013.01)

(58) Field of Classification Search
CPC ............ B60R 21/21656; B60R 21/217; B60R 21/203
See application file for complete search history.

(56) References Cited

U.S. PATENT DOCUMENTS

| | | | |
|---|---|---|---|
| 7,641,222 B2* | 1/2010 | Schramm | 280/728.3 |
| 8,474,859 B2* | 7/2013 | Weigand | 280/728.2 |
| 2005/0194768 A1* | 9/2005 | Bonam et al. | 280/728.2 |
| 2008/0100039 A1* | 5/2008 | Schramm | 280/728.2 |
| 2008/0100040 A1* | 5/2008 | DePottey et al. | 280/728.2 |
| 2009/0315304 A1* | 12/2009 | Hagelgans et al. | 280/728.2 |
| 2011/0148077 A1* | 6/2011 | Enders | 280/728.2 |
| 2014/0145419 A1* | 5/2014 | Ishikawa et al. | 280/728.3 |

* cited by examiner

*Primary Examiner* — Drew Brown
(74) *Attorney, Agent, or Firm* — Sherr & Jiang, PLLC

(57) ABSTRACT

A device for assembling an airbag cover according to the present invention includes: a mounting plate; and an airbag cover which covers the mounting plate, in which a hook portion is formed on the airbag cover, a fastening unit into which the hook portion is inserted, and an insertion member, which pushes the hook portion toward the fastening unit after the hook portion is inserted into the fastening unit, are formed on the mounting plate, and as a result, the airbag cover may be securely assembled to the mounting plate.

13 Claims, 5 Drawing Sheets

DEVICE FOR ASSEMBLING AIRBAG COVER

CROSS-REFERENCE TO RELATED APPLICATIONS

The present application claims priority to Korean Patent Application Number 10-2013-0064210 filed Jun. 4, 2013, the entire contents of which the application is incorporated herein for all purposes by this reference.

TECHNICAL FIELD

The present invention relates to a device for assembling an airbag cover, and more particularly, to a device for assembling an airbag cover on a mounting plate mounted on a steering wheel.

BACKGROUND

A driver's airbag, which is deployed toward a driver at the time of a vehicle collision accident in order to reduce severity of injury to the driver's upper body and face due to a steering wheel, is now generally installed in most vehicles.

As illustrated in FIG. 1, in a driver's airbag according to the related art, hook portions 2a and guide bars 2b, which are formed on a mounting plate, protrude through opening portions in an airbag cover 1, and thereby, the airbag cover 1 is coupled to the mounting plate 2.

However, in a case in which excessive internal pressure is applied when an airbag cushion accommodated in the mounting plate 2 is deployed, the guide bar is deformed, which causes the airbag cover 1 to be moved away from the mounting plate 2, and as a result, there is a problem in that the airbag cover is pulled out while the airbag cushion is deployed. In addition, the mounting plate 2 and the airbag cover 1 cannot be securely fastened, and as a result, there is a problem in that noise and the like occur.

SUMMARY

The present invention has been made in an effort to provide a device for assembling an airbag cover, by which an airbag cover may be securely and conveniently assembled to a mounting plate.

Technical problems of the present invention are not limited to the aforementioned technical problems, and other technical problems, which are not mentioned above, may be clearly understood by those skilled in the art from the following descriptions.

An exemplary embodiment of the present invention provides a device for assembling an airbag cover, including: a mounting plate; and an airbag cover which covers the mounting plate, in which a hook portion is formed on the airbag cover, and a fastening unit to which the hook portion is coupled, and an insertion member which pushes the hook portion toward one side are formed on the mounting plate.

The insertion member may be formed below the fastening unit, and when the insertion member is pressed upward after the hook portion is coupled to the fastening unit, the insertion member may be separated from the mounting plate, and then inserted between a main body of the mounting plate and the hook portion.

The fastening unit may include left and right walls which protrude outward from a main body of the mounting plate and are extended in an up and down direction, and an outer circumferential wall which is connected to the left and right walls so as to form a hollow portion into which the hook portion is inserted.

The hook portion may include a hook portion main body which is inserted into the hollow portion of the fastening unit, and a protruding stepped portion which is formed to protrude outward at a lower end of the hook portion main body.

The hook portion may include a reinforcing portion which is formed integrally with the hook portion main body at an inner side of an upper portion of the hook portion main body so as to form a space portion between the main body of the mounting plate and the hook portion main body, and protrudes leftward and rightward further than the hook portion main body so that a bottom surface of the reinforcing portion comes into contact with and is caught by upper surfaces of the left and right walls of the fastening unit when the hook portion main body is inserted into the hollow portion of the fastening unit.

The insertion member may be connected with lower portions of the left and right walls of the fastening unit by connecting bars, and as fracture portions, which may be fractured when a predetermined amount of force is applied thereto, notch portions may be formed in the connecting bars.

When upward force is applied to the insertion member after the hook portion main body is inserted into the fastening unit, the fracture portions may be fractured, and thereafter, when the insertion member is pressed upward, the insertion member may be inserted into the space portion between the main body of the mounting plate and the hook portion main body.

A thickness of the insertion member may be greater than a width of the space portion, and an inclined surface may be formed on an upper end portion of the insertion member.

A supporting portion, which supports the protruding stepped portion of the hook portion after the insertion member is moved upward, may be formed at a lower end of the insertion member.

A projection may be formed on an inner portion of the insertion member, and a catching stepped portion by which the projection is caught may be formed on the mounting plate.

According to the present invention, there are one or more effects as follows.

Firstly, since the insertion member having a wedge structure is formed integrally with the mounting plate by injection molding, it is not necessary to separately manage components such that convenience in assembly is improved, and it is possible to implement processes using the existing equipment, thereby simplifying the processes.

Secondly, since the insertion member is inserted into a portion where the airbag cover and the mounting plate are coupled, it is possible to prevent fastening force of the coupling portion from deteriorating due to vibration of a vehicle, and prevent the assembly from being disassembled, thereby improving rigidity when an airbag is deployed.

Thirdly, since a hook structure is used as a device for assembling an airbag cover, it is possible to reduce a weight by eliminating a portion of a wall portion of the existing airbag cover where no load is applied.

The effects of the present invention are not limited to the aforementioned effects, and other effects, which are not mentioned above, will be clearly understood by those skilled in the art from the claims.

DETAILED DESCRIPTION

Figure 1:
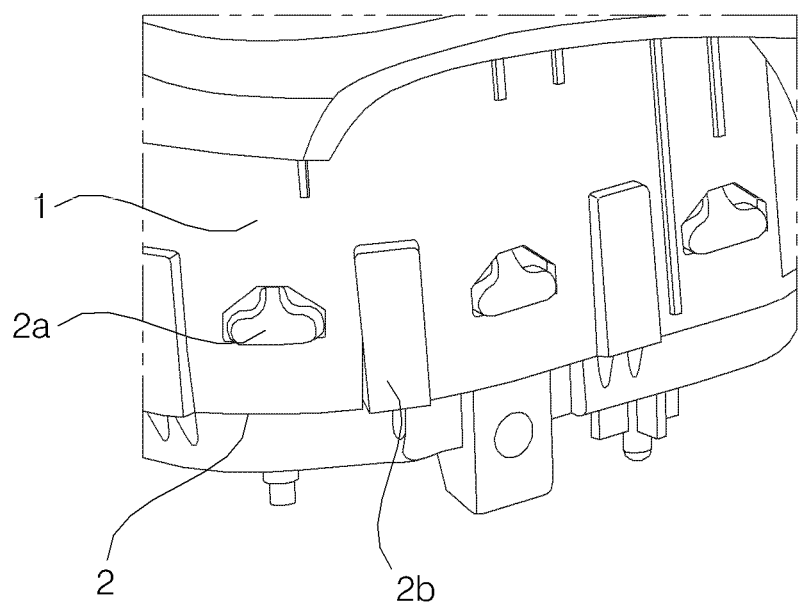
FIG. 1 is a perspective view illustrating an assembly structure of an airbag cover according to the related art.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, the present invention will be described with reference to the drawings for explaining an airbag for a vehicle according to exemplary embodiments of the present invention.

Figure 2:
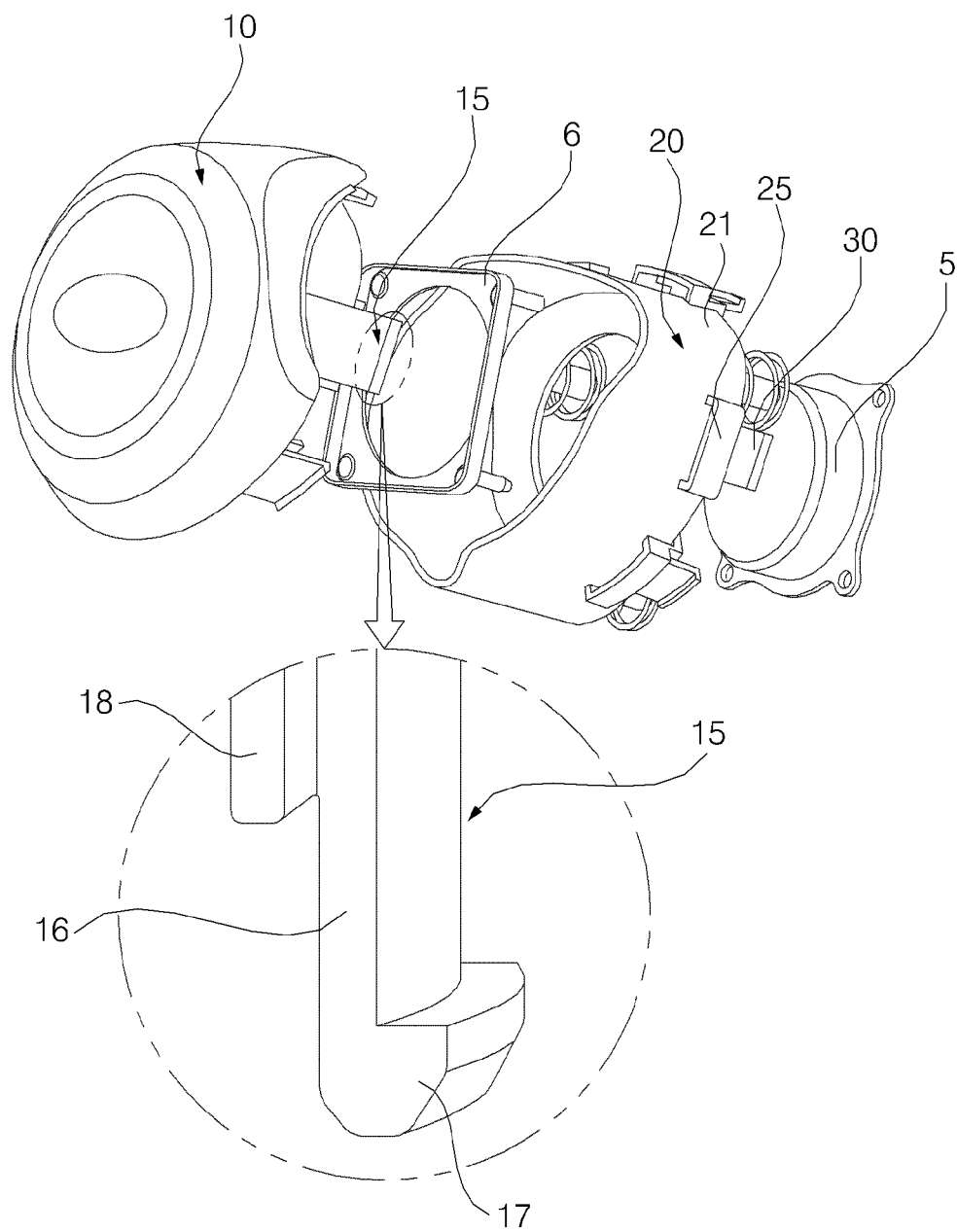
FIG. 2 is an exploded perspective view illustrating a device for assembling an airbag cover according to an exemplary embodiment of the present invention.
Figure 3:
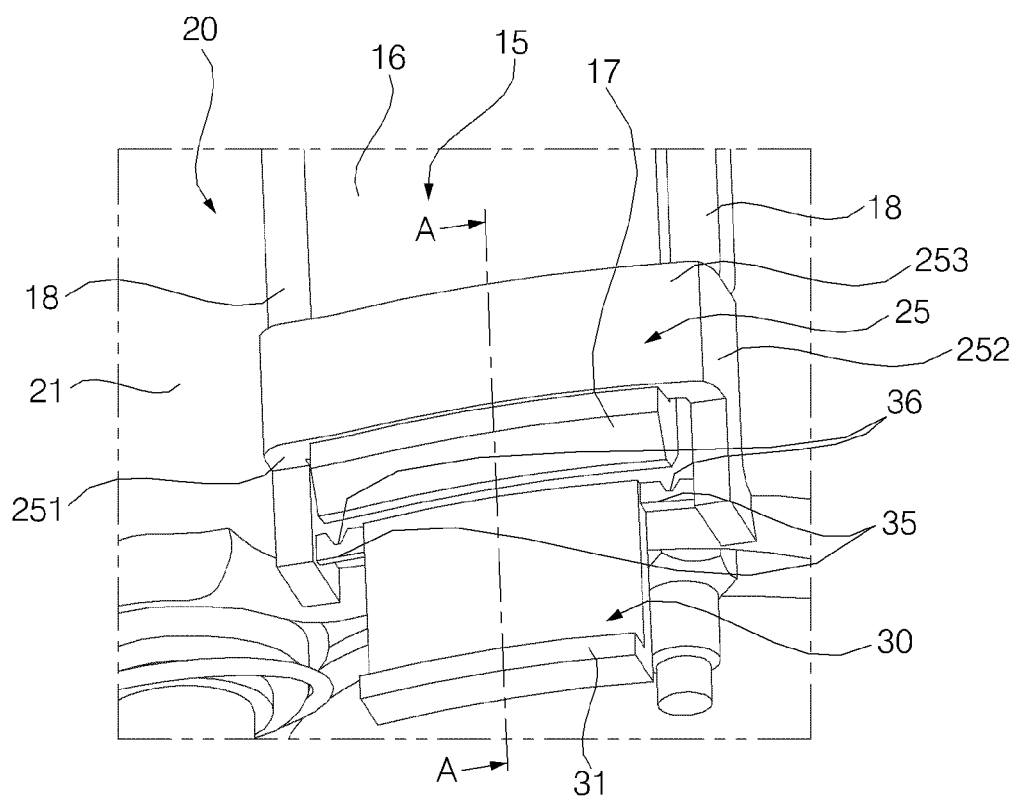
FIG. 3 is a perspective view illustrating a part of a mounting plate illustrated in FIG. 2.
Figure 4:
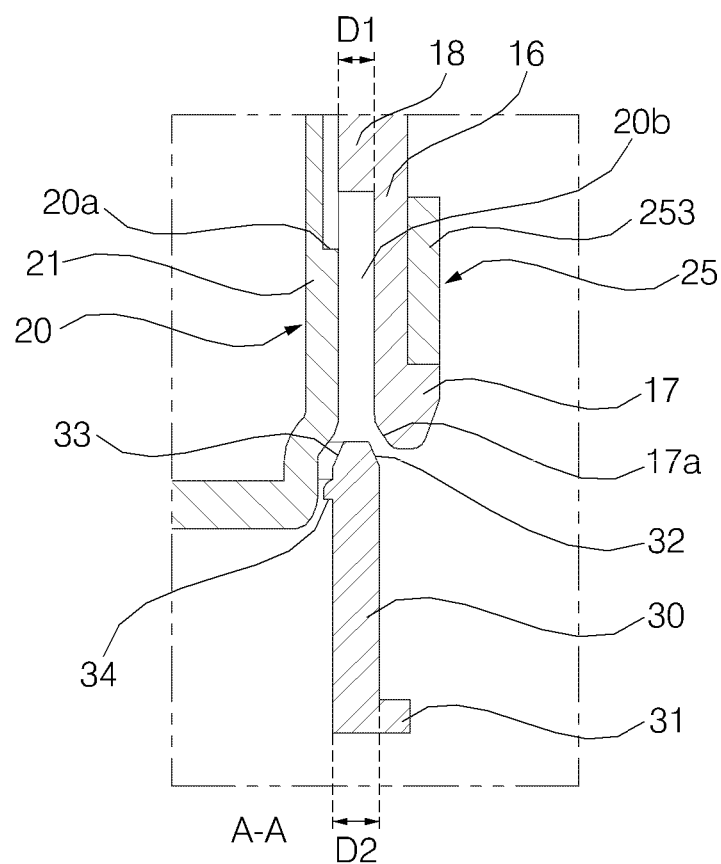
FIG. 4 is a cross-sectional view taken along line A-A of FIG. 3.
Figure 5:
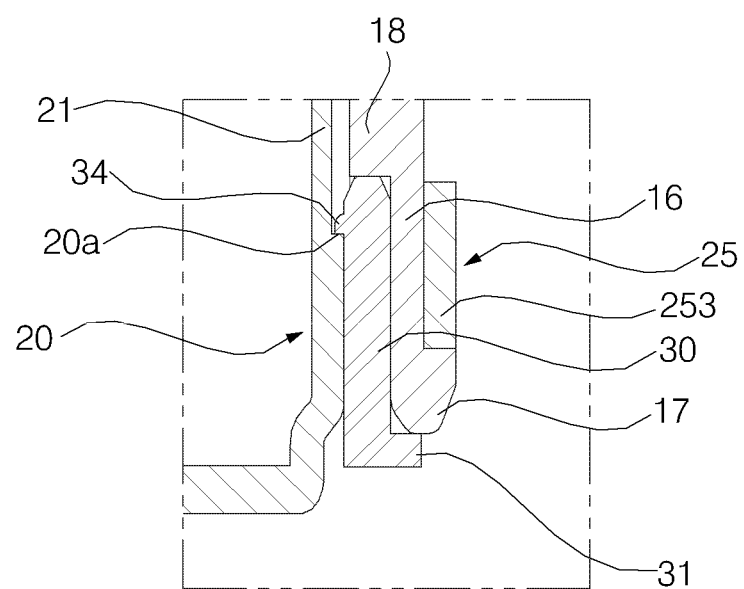
FIG. 5 is a cross-sectional view illustrating an operational state of FIG. 4.

FIG. 2 is an exploded perspective view illustrating a device for assembling an airbag cover according to an exemplary embodiment of the present invention, FIG. 3 is a perspective view illustrating a part of a mounting plate illustrated in FIG. 2, FIG. 4 is a cross-sectional view taken along line A-A of FIG. 3, and FIG. 5 is a cross-sectional view illustrating an operational state of FIG. 4.

As illustrated in FIG. 2, a device for assembling an airbag cover according to the present invention includes a mounting plate 20 in which a retainer 6 on which an inflator 5 and an airbag cushion are installed is accommodated, and an airbag cover 10 which covers the mounting plate 20.

A hook portion 15 is formed on the airbag cover 10, and the mounting plate 20 has a cylindrical main body 21, a fastening unit 25 which is positioned outside the main body 21 and coupled to the hook portion 15, and an insertion member 30 which is moved upward to push the hook portion 15 toward one side.

As illustrated in FIG. 3, the fastening unit 25 is formed with left and right walls 251 and 252 which protrude outward from the main body 21 of the mounting plate and are extended in an up and down direction, and an outer circumferential wall 253 which is connected to the left and right walls 251 and 252 and forms a hollow portion into which the hook portion 15 is inserted.

The hook portion 15 has a hook portion main body 16 which is inserted into the hollow portion of the fastening unit 25, and a protruding stepped portion 17 which protrudes outward at a lower end of the hook portion main body 16.

The hook portion 15 includes a reinforcing portion 18 which is formed integrally with the hook portion main body 16 at an inner side of an upper portion of the hook portion main body 16 so as to form a space portion 20b between the main body 21 of the mounting plate and the hook portion main body 16, and protrudes leftward and rightward further than the hook portion main body 16 so that a bottom surface of the reinforcing portion 18 comes into contact with and is caught by upper surfaces of the left and right walls 251 and 252 of the fastening unit 25 when the hook portion main body 16 is inserted into the hollow portion of the fastening unit 25.

As illustrated in FIGS. 2 to 5, the insertion member 30 is formed below the fastening unit 25. When the insertion member 30 is pressed upward after the hook portion 15 is coupled to the fastening unit 25, the insertion member 30 is separated from the mounting plate 20 and then inserted between the hook portion 15 and the main body 21 of the mounting plate.

The insertion member 30 is connected with lower portions of the left and right walls 251 and 252 of the fastening unit 25 by connecting bars 35, and as fracture portions 36, which may be fractured when a predetermined amount of force is applied thereto, notch portions are formed in the connecting bars 35. Meanwhile, the insertion member 30, the fastening unit 25, and the connecting bars 35 are formed integrally with the main body 21 of the mounting plate by injection molding.

When upward force is applied to the insertion member 30 after the hook portion main body is inserted into the hollow portion of the fastening unit 25, the fracture portions 36 are fractured, and thereafter, when the insertion member 30 is pressed upward, the insertion member 30 is inserted into the space portion 20b between the main body 21 of the mounting plate and the hook portion main body 16.

A supporting portion 31, which supports the protruding stepped portion 17 of the hook portion after the insertion member 30 is moved upward, is formed at a lower end of the insertion member 30.

A thickness D2 of the insertion member 30 is greater than a separation distance between the main body 21 of the mounting plate and the hook portion main body 16, which is a width D1 of the space portion, inclined surfaces 32 and 33 are formed at an upper end of the insertion member 30, a projection 34 is formed on an inner portion of the insertion member 30, and a catching stepped portion 20a by which the projection 34 is caught is formed on the main body 21 of the mounting plate.

An operation of the device for assembling an airbag cover according to the present invention, which is configured as described above, will be described below.

When the hook portion main body 16 of the airbag cover 10 is inserted into the hollow portion formed in the fastening unit 25 of the mounting plate 20 in order to couple the airbag cover 10 to the mounting plate 20, the protruding stepped portion 17 of the hook portion protrudes to the outside at a lower side of the fastening unit 25, such that the airbag cover 10 is assembled to the mounting plate 20.

Next, when a predetermined amount of upward force is applied to the insertion member 30, portions where the notch portions, which are the fracture portions 36 formed in the connecting bars 35, are formed are fractured, and when the insertion member 30 is consecutively pressed upward, the insertion member 30 is inserted into the space portion 20b between the main body 21 of the mounting plate and the hook portion main body 16, and then pushes the hook portion main body 16 toward the outer circumferential wall 253 of the fastening unit 25.

Accordingly, the hook portion 15 is securely coupled to the fastening unit 25.

Meanwhile, since a tip portion of the insertion member 30 has the inclined surfaces 32 and 33, the inclined surfaces 32 and 33 are easily inserted into the space portion 20b along an inclined surface formed on the mounting plate and an inclined surface 17a formed on the protruding stepped portion 17 of the hook portion. When the insertion member 30 is completely inserted, the projection 34, which is formed on the inner side of the insertion member 30, is coupled to the catching stepped portion 20*a* that is formed on the main body 21 of the mounting plate, thereby preventing the insertion member 30 from being moved away from the space portion 20*b*.

Since the supporting portion 31 of the insertion member 30 supports upward a lower end portion of the protruding stepped portion 17 of the hook portion, the hook portion 15 is more securely coupled to the fastening unit 25.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. A device for assembling an airbag cover, comprising:
   a mounting plate; and
   an airbag cover which covers the mounting plate,
   wherein a hook portion is formed on the airbag cover, and a fastening unit to which the hook portion is coupled, and an insertion member which pushes the hook portion toward one side are formed on the mounting plate,
   wherein the insertion member is connected to the mounting plate by a connecting bar that is fractured when a predetermined amount of force is applied to the connecting bar.

2. The device of claim 1, wherein the connecting bar is positioned at a lower portion of the fastening unit.

3. The device of claim 1, wherein the insertion member is formed at a lower side of the fastening unit and positioned to be movable toward the fastening unit.

4. The device of claim 1, wherein an inclined surface is formed on an upper end portion of the insertion member.

5. The device of claim 1, wherein a projection is formed on an inner portion of the insertion member, and a catching stepped portion by which the projection is caught is formed on the mounting plate.

6. A device for assembling an airbag cover, comprising:
   a mounting plate; and
   an airbag cover which covers the mounting plate,
   wherein a hook portion is formed on the airbag cover,
   wherein a fastening unit to which the hook portion is coupled, and an insertion member which pushes the hook portion toward one side are formed on the mounting plate,
   wherein the fastening unit includes left and right walls which protrude outward from a main body of the mounting plate and are extended in an up and down direction, and an outer circumferential wall which is positioned between the left and right walls so as to form a hollow portion into which the hook portion is inserted.

7. The device of claim 6, wherein the insertion member is connected with lower portions of the left and right walls of the fastening unit by connecting bars.

8. The device of claim 7, wherein a fracture portion capable of being fractured is formed in the connecting bar.

9. The device of claim 6, wherein the hook portion includes a hook portion main body which is inserted into the hollow portion of the fastening unit, and a protruding stepped portion which is formed to protrude outward at a lower end of the hook portion main body.

10. The device of claim 9, wherein a supporting portion, which supports the protruding stepped portion of the hook portion, is formed at a lower end of the insertion member.

11. The device of claim 9, wherein the hook portion has a reinforcing portion which is formed integrally with the hook portion main body at an inner side of an upper portion of the hook portion main body so as to form a space portion between the main body of the mounting plate and the hook portion main body.

12. The device of claim 9, wherein the insertion member is inserted into a space portion formed between the main body of the mounting plate and the hook portion main body.

13. The device of claim 12, wherein a thickness of the insertion member is greater than a separation distance between the main body of the mounting plate and the hook portion main body.

* * * * *